United States Patent [19]

Gagneux

[11] Patent Number: 4,559,465

[45] Date of Patent: Dec. 17, 1985

[54] BRUSH HOLDER ASSEMBLY FOR AN ELECTRIC MOTOR

[75] Inventor: Georges C. Gagneux, Chatellerault, France

[73] Assignee: Equipements Automobiles Marshall, Issy-Les-Moulineaux, France

[21] Appl. No.: 601,620

[22] PCT Filed: Jul. 21, 1983

[86] PCT No.: PCT/FR83/00149

§ 371 Date: Mar. 22, 1984

§ 102(e) Date: Mar. 22, 1984

[87] PCT Pub. No.: WO84/00645

PCT Pub. Date: Feb. 16, 1984

[30] Foreign Application Priority Data

Jul. 22, 1982 [FR] France ................................ 82 12826

[51] Int. Cl.[4] ............................................ H02K 13/00

[52] U.S. Cl. .................................... 310/242; 310/246; 310/247

[58] Field of Search ............... 310/239, 240, 241, 242, 310/244, 245, 246, 247, 248, 249

[56] References Cited

U.S. PATENT DOCUMENTS

| | | | |
|---|---|---|---|
| 3,138,728 | 6/1964 | Videtic | 310/247 |
| 3,182,218 | 5/1965 | Videtic | 310/247 |
| 4,112,321 | 9/1978 | Wan | 310/242 |
| 4,163,167 | 7/1979 | Zelt et al. | 310/242 |

FOREIGN PATENT DOCUMENTS

| | | | |
|---|---|---|---|
| 1951503 | 4/1970 | Fed. Rep. of Germany | 310/242 |
| 1130026 | 4/1954 | France | 310/242 |
| 1084485 | 1/1955 | France | 310/242 |

*Primary Examiner*—R. Skudy
*Attorney, Agent, or Firm*—Brisebois & Kruger

[57] ABSTRACT

A brush holder for an electric motor having a commutator. The brush holder includes a simple flat plate (10) cut or stamped to provide slots (20) for sliding of the brushes (12) and openings (26) for holding the brush springs (14). The springs (14) normally engage the ends of the associated brushes (12) to bias them inwardly towards the motor commutator. When the brushes are retracted, the springs engage the sides of the brushes to lock the brushes in the slots.

7 Claims, 2 Drawing Figures

BRUSH HOLDER ASSEMBLY FOR AN ELECTRIC MOTOR

The present invention relates to a brush holder and to an electric motor provided with such a brush holder.

In numerous types of electric motors the electrical continuity between the rotating armature and the fixed circuit connected thereto is ensured by co-operation between a commutator mounted on the rotor, and brushes, particularly of the carbon type, held by a brush holder so as to make contact with the rotating commutator.

In view of the wear of the brushes and the manufacturing tolerances, it is essential that the brushes be pushed resiliently against the commutator. Consequently, during operations involving assembly and disassembly of such motors, when the commutator is not positioned between the brushes, the brushes tend to be driven out of the housings in which they can slide, by the devices which normally push them back towards the commutator. As a result, the assembly of a motor constitutes an awkward operation, particularly if there is a large number of brushes.

U.S. Pat. No. 4,163,167 describes a brush holder ,hich does not have the above-mentioned disadvantage. In fact, the brush holder described in that patent comprises a support means having a central opening for the passage of a motor commutator and including two housings of rectangular cross-section permitting two brushes to slide in an approximately radial direction. Each brush has a rectangular cross-section and its radially outer end face is inclined slightly towards one side. Studs fixed on the support means each have a spring comprising, a hook arm fixed on a projection of the support means and a biasing arm which normally pushes the associated brush towards the central opening for the commutator, the biasing arm acting by resting against the slightly inclined end face. According to that patent, the lateral face of the brush has a small notch which faces towards the biasing arm of the spring, and the arm of the spring is sufficiently long for the end of the spring arm to leave the end face and come against the lateral face when the brushes are pushed back towards the exterior to a maximum. The spring thus exerts a force perpendicular to the sliding direction of the brush which is consequently jammed against the wall of its housing and cannot slide towards the centre.

This device for holding brushes in an outer or retracted position is perfectly satisfactory. Before assembly of the motor, the brushes are pushed outwardly manually so that the associated springs hold them in these positions. After assembly of the commutator, the brushes require only a slight push inwardly to enable them to return to the interior. The end of the spring arm leaves the notch formed on the lateral face and comes to rest against the end face. From this moment, the spring pushes the corresponding brush back towards the commutator However, the described device has disadvantages. In fact, the support means is very complicated as it has to form a housing of rectangular cross-section for the sliding of each brush and has to comprise a projection for hooking the end of the spring opposite the biasing arm. Moreover, the support requires studs to hold the springs in a suitable position. Consequently, the brush holder support means is very expensive and is awkward to produce. Furthermore, this brush holder is quite bulky and is therefore unsuitable for small sized motors, particularly for control for automobile accessories.

The invention relates to a brush holder which has the advantageous characteristic of holding both brushes in the outer or retracted position by means of the spring which is normally used for pushing the brush towards the commutator. However, the brush holder support means according to the invention is extremely simple and inexpensive to produce. More specifically, it is formed as a single part cut from a flat plate. The support means does not have to meet close tolerances and no further operation is required after cutting, for example by stamping.

In particular, the invention relates to a brush holder comprising:

a support means having an opening for the passage of an electric motor commutator, the support means having at least two guides for guiding the brush in an approximately radial direction and, a holder for the spring of each brush at least two brushes each slidable in the above-mentioned guides between an outer position and an inner position, and at least two springs having a first hooking end connected to the support means and a second biased end provided with an arm, the arm being arranged in such a way that, when the associated brush is in its inner position, the end of the arm rests against an end face of the associated brush which is approximately transverse to the sliding direction of this brush, and that, when the brush is in its outer position, the end of the arm rests against a surface of the associated brush which is approximately parallel to the sliding direction of the brush.

Consequently, when the brush is in the outer position, the arm does not push it radially inwards but locks it in the guide whereas, when the brush is in the inner position, the spring pushes it radially inwardly towards the commutator.

According to the invention, the support means is a flat plate having in its central region an opening for the passage of an electric motor commutator, two slots at least approximately radial parallel edges opening into the opening and ending short of the outer perimeter of the plate so as to constitute brush guides, each brush comprising two rectilinear grooves symmetrical about its axis by means of which it slides along the edges of the associated slot. The plate comprises, for each slot, an opening for housing a spring and an orifice or notch for holding the first hooking end of a spring.

It is advantageous that each orifice for holding the first hooking end of the spring merges into the opening for housing the spring. Moreover, each opening for housing a spring is advantageously of approximately circular shape, designed to house the turns of a helical spring, and the holding orifice is of an elongated shape approximately parallel to the circular edge of the opening, this orifice merging into the opening via a passage whose width is smaller than the length of the orifice so as to define a locking tab between the opening and the orifice.

Each spring advantageously comprises a helical body portion having, at a first end, a hooking portion forming two bends at approximately 90° and, at the other end, a rectilinear or slightly bent arm.

The support means is advantageously of circular shape and it comprises at its outer perimeter some notches designed to allow locking of the brush holder to prevent the brush holder from rotating.

It is advantageous to form the support means by cutting from a plate of insulating plastic material.

The invention also relates to an electric motor having a commutator comprising a brush holder of the type described above.

Thus, the brush holder according to the invention comprises only a flat plate which is very simple to manufacture, the desired number of brushes of a conventional type having merely two grooves, and a corresponding number of springs of a very simple and very strong type. This small number of elements and the ease of manufacturing them permit production of an inexpensive brush holder.

To assist understanding of the subject of the invention, an embodiment shown in the attached drawings will now be described as a non-limiting example.

Figure 1:
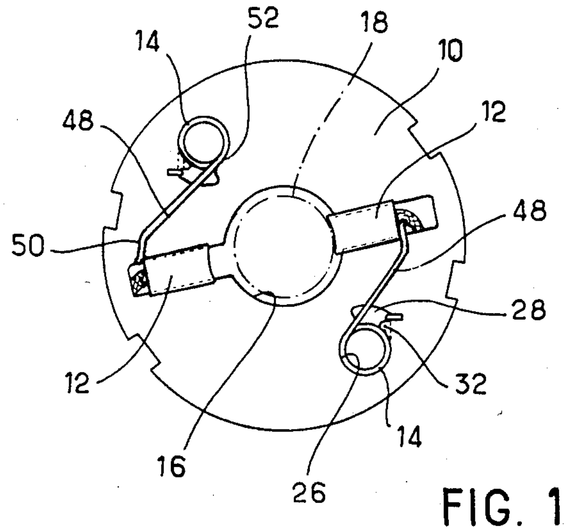
FIG. 1 is a schematic plan view of a brush holder according to the invention comprising only two brushes of which one is shown in the inner position and the other in the outer position.
Figure 2:
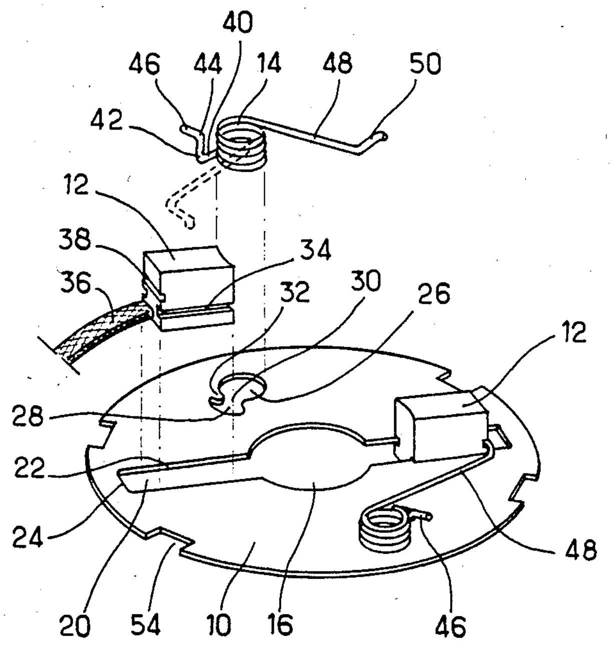
FIG. 2 is a perspective view of the brush holder in FIG. 1 of which the left-hand portion is exploded so as to reveal clearly the configuration of the brush and the spring.

The brush holder according to the invention as shown in FIGS. 1 and 2 essentially comprises a support means in the form of a plate 10, brushes 12 and springs 14.

The support means is formed by a cut out flat plate 10. It is made from any rigid and electrically insulating plastic material, for example of the bakelite type. In one embodiment, it has a diameter of approximately 6 cm and a thickness of approximately 2 mm. In fact, this plate has to withstand only very slight mechanical stresses and it is subjected to virtually no wear. It comprises a circular central opening 16 designed for the passage of the commutator 18 of the rotor of an electric motor (the commutator 18 is shown in dot-dash lines in FIG. 1). Two slots 20 of rectilinear shape are arranged radially to the central opening 16 into which they open out. They have rectilinear parallel edges 22 and are closed at their radially transverse ends 24 at the periphery of the plate 10. The two slots 20 are symmetrical about the axis of the plate 10.

Openings 26 for receiving the springs are offset by an angle of approximately 60° relative to the slots 20. Notches provide an elongated additional opening 28 approximately parallel to the edges of the openings 26 and communicate with the associated opening 26 via a passage 30 whose width is smaller than the length of the additional opening 28. The additional openings 28 include a notch so that a tab 32 is defined between the opening 26 and the additional opening 28.

Each brush 12 has a parallelepiped body made of carbon or sintered bronze, of which the end facing the commutator is rounded with a radius corresponding to that of the commutator in known manner. Two opposing side faces of the body comprise parallel grooves 34 of which the bottoms are separated by a distance slightly smaller than the distance separating the edges 22 of the slots 20. The width of the brush, measured between the faces having the grooves 34, is greater than the width of the slot 20 so that, when the grooves are slid on the edges 22, each brush 12 is guided along a slot 20 but cannot travel in a direction other than the longitudinal direction of the associated slot 20.

Each brush is integral with a connecting wire 36, advantageously a stranded copper wire, and its outer face comprises a groove 38 of shallow depth, of which the bottom is slightly inclined, this groove being provided to receive and position the end of the brush biasing arm 48 of a spring 14.

Each spring 14 is a torsion spring having a helically wound body of an external diameter, of an external diameter, in a relaxed condition of the spring, which is very slightly smaller than the circular spring receiving opening 26 in plate 10. A first end of spring 14 has a retaining hook with a straight portion 40 and two 90° bends at 42 and 44 to provide a tip 46. Tip 46 is generally parallel to and on one side of the plate 10 when the spring is mounted in an opening 26, and straight portion 40 is parallel to and on the other side of the plate 10.

A second end of the spring includes an arm 48 for engaging with its end 50, an outer end face of the brush, to urge the brush inwardly. The tip of end 50 is slightly bent.

FIGS. 1 and 2 clearly show the relative arrangement of the various elements. Each brush is guided in a slot 20 for sliding movement, with the edges 22 of the slot extending into the grooves 34 in the brushes. The end 50 of arm 48 normally rests against the outer face of the brush, as indicated in the right-hand portion of FIG. 1. On the other hand, when the brush is in the outer or retracted position, as indicated in the left-hand portion of FIG. 1 or/and right-hand portion of FIG. 2, the curved tip of end 50 of the arm 48 presses against a lateral face of the brush, as shown, for example, in FIG. 1. Consequently, this brush is held against an edge 22 of the associated slot 20 and cannot slide towards the commutator 18. The achievement of this characteristic is important according to the invention. It means that the openings 26 must have a suitable position on the plate 10. More particularly, this characteristic of locking the brush in the outer position is achieved when the distance, measured parallel to the longitudinal axis of the slot 20, between the point 52 of articulation of the arm 48 and the centre of the opening 16 is clearly smaller than the distance separating the end 50 of the arm 48 from the centre of the opening 16 when the curve tip of this end 50 is located on the corner connecting the lateral face of the brush 12 to its outer face. Moreover, it is preferable for the end of the arm 48 to be slightly bent so that the actual end 50 in groove 38 against the outer face of the brush, and not an intermediate portion when the brush is moved inwardly to the position shown at the right hand side of FIG. 1.

The fitting of the brush holder according to the invention is very simple. In fact, it is sufficient to push the turns of the spring 14 into the opening 26 in such a way that the straight portion 40 passes through passage 30 connecting this opening to the additional opening 28. A clockwise force is the exerted on the arm 48 and brings the intermediate leg of the spring (between portion 40 and tip 46) into the bottom of the additional opening 28. In this position, spring 14 is held in opening 26 and cannot come out of the opening from either side of the plate, since tip 46 extends across one side of the plate, and portion 40 is on the other side of the plate and under tab 32. Arm 48 is held with one hand while the operator slides the corresponding brush into the slot 20 from the central opening 16, the edges 22 sliding in the grooves 34. The operator pushes the brush sufficiently far towards the end 24 of the slot 20 for the end 50 of the arm 48 to rest against the side of the brush 12. The operator then releases the arm 48 to lock the brush in this outer position, and can then install the other brush.

During manufacture of an electric motor, the brush holders on which the brushes are located in the locked outer position are mounted in the motor and, when the rotor has been positioned, an operator simply slides the brushes towards the commutator while the spring end 50 automatically slides on the lateral face and rests against the end face as shown in the right-hand portion of FIG. 1. The shape of the support plate 10 allows ample access for the brushes 12, making this operation very simple.

Although an embodiment comprising only two brushes has been described, the invention can be applied to any number of brushes. Moreover, although it was mentioned that the additional opening communicated with the spring-housing opening, this characteristic is not essential as a mere hole permitting passage of the hooking end of the spring is sufficient for carrying out the invention. Furthermore, although the Figures illustrate notches 54 designed for fixing the plate 10, the plate can be held in any other suitable way. Moreover, it is not essential for it to have a circular shape.

It is obvious that the brush holder described above can be modified in any desired way without departing from the scope of the invention.

I claim:

1. A brush holder for an electric motor having a commutator, said brush holder comprising, a substantially flat plate having a generally central opening therein for receiving the motor commutator, first and second brush guiding slots formed in said plate, each of said slots opening into said central opening and extending outwardly of the central opening, each of said slots having generally parallel side edges; a first brush in said first slot and having oppositely opening grooves slidably mounting the first brush between the side edges of the first slot, a second brush in said second slot and having oppositely opening grooves slidably mounting the second brush between the side edges of the second slot; first and second brush spring receiving openings formed in said plate in spaced relation respectively to said first and second brush guiding slots; first and second torsion brush springs each comprising a body, an arm extending from one end of the body, and a retaining hook extending from the other end of the body; said brush springs being mounted on said plate with said bodies extending respectively into said first and second brush spring receiving openings; a notch communicating with said first brush spring receiving opening and defining a tab for engaging and retaining the retaining hook of the first brush spring, a notch communicating with said second brush spring receiving opening and defining a tab for engaging and retaining the retaining hook of the second brush spring, said arm of said first brush spring being engageable with an end of said first brush to urge the first brush inwardly toward the commutator and said arm of said second brush spring being engageable with an end of said second brush to urge said second brush inwardly toward the commutator, said first brush being movable outwardly in its slot to a retracted position in which said arm of said first brush spring engages a side face of the first brush to hold the first brush in said retracted position, and said second brush being movable outwardly in its slot to a retracted position in which said arm of said second brush spring engages a side face of the second brush to hold the second brush in said retracted position.

2. A brush holder for an electric motor having a commutator, said brush holder comprising, a substantially flat plate having a generally central opening therein for receiving the motor commutator, first and second brush guiding slots formed in said plate, each of said slots opening into said central opening and extending outwardly of the central opening, each of said slots having generally parallel side edges; a first brush in said first slot and having oppositely opening grooves slidably mounting the first brush between the side edges of the first slot, a second brush in said second slot and having oppositely opening grooves slidably mounting the second brush between the side edges of the second slot; first and second brush spring receiving openings formed in said plate in spaced relation respectively to said first and second brush guiding slots; first and second brush springs each comprising a body, an arm extending from one end of the body, and a retaining hook extending from the other end of the body; said brush springs being mounted on said plate with said bodies extending respectively into said first and second brush spring receiving openings; first and second additional openings formed in said plate for receiving and retaining the respective retaining hooks of the brush springs, said arm of said first brush spring being engageable with an end of said first brush to urge the first brush inwardly toward the commutator and said arm of said second brush spring being engageable with an end of said second brush to urge said second brush inwardly toward the commutator, said first brush being movable outwardly in its slot to a retracted position in which said arm of said first brush spring engages a side face of the first brush to hold the first brush in said retracted position, and said second brush being movable outwardly in its slot to a retracted position in which said arm of said second brush spring engages a side face of the second brush to hold the second brush in said retracted position.

3. A brush holder according to claim 2 wherein said additional openings for holding the hooks of said springs merge respectively into said spring receiving openings.

4. A brush holder according to claim 2 wherein said body includes a helical body, said retaining hook of each of said brush springs comprises two bends at approximately 90° to each other, and said arm of each of said brush springs comprises a straight arm with a bent end.

5. A brush holder according to claim 2 wherein said plate comprises a circular plate with notches formed at it outer periphery for locking the brush holder to a motor.

6. A brush holder according to claim 2 wherein said plate comprises a flat plate cut from electrically insulating material.

7. A brush holder according to claim 2 wherein said end of said first brush has a groove for receiving the arm of said first brush spring, and said end of said second brush has a groove for receiving the arm of said second brush spring.

* * * * *